(12) United States Patent
Sherman

(10) Patent No.: US 6,398,195 B1
(45) Date of Patent: Jun. 4, 2002

(54) METHOD OF AND APPARATUS FOR PRODUCING SUB-MICRON BUBBLES IN LIQUIDS AND SLURRIES

(75) Inventor: Jeffrey H. Sherman, The Woodlands, TX (US)

(73) Assignee: GRT, Inc., The Woodlands, TX (US)

( * ) Notice: Subject to any disclaimer, the term of this patent is extended or adjusted under 35 U.S.C. 154(b) by 0 days.

(21) Appl. No.: 09/694,557

(22) Filed: Oct. 23, 2000

Related U.S. Application Data

(63) Continuation-in-part of application No. 09/368,405, filed on Aug. 4, 1999, now abandoned, which is a continuation-in-part of application No. 09/224,394, filed on Dec. 31, 1998, now Pat. No. 6,129,818, which is a continuation-in-part of application No. 09/058,494, filed on Apr. 10, 1998, now Pat. No. 5,954,925.

(51) Int. Cl.$^7$ ................................................ B01F 3/04
(52) U.S. Cl. ........................ 261/81; 261/83; 261/122.1
(58) Field of Search .................... 261/28, 32, 33, 261/83, 87, 81, 93, 122.1, 122.2, DIG. 70; 96/291; 95/226; 55/405

(56) References Cited

U.S. PATENT DOCUMENTS

| | | | | |
|---|---|---|---|---|
| 2,448,590 A | * | 9/1948 | Gunther | 261/93 |
| 3,118,958 A | * | 1/1964 | White | 261/122.1 |
| 4,117,048 A | * | 9/1978 | Stockner et al. | 261/93 |
| 4,159,307 A | * | 6/1979 | Shigeyasu et al. | 261/93 |
| 4,228,112 A | * | 10/1980 | Hise | 261/93 |
| 4,521,349 A | * | 6/1985 | Weber et al. | 261/93 |
| 4,717,515 A | * | 1/1988 | Forsyth et al. | 261/122.1 |
| 4,793,714 A | * | 12/1988 | Gruber | 261/81 |
| 6,193,221 B1 | * | 2/2001 | Sherman | 261/87 |

FOREIGN PATENT DOCUMENTS

| | | | | |
|---|---|---|---|---|
| JP | 52-65179 A | * | 5/1977 | 261/81 |

* cited by examiner

Primary Examiner—C. Scott Bushey
(74) Attorney, Agent, or Firm—Michael A. O'Neil

(57) ABSTRACT

In a method of and apparatus for producing sub-micron bubbles in liquids and slurries, gas is maintained on the interior of the gas permeable partition at predetermined pressure. Relative movement between the gas permeable partition and a liquid forms sub-micron sized bubbles in the liquid.

7 Claims, 5 Drawing Sheets

METHOD OF AND APPARATUS FOR PRODUCING SUB-MICRON BUBBLES IN LIQUIDS AND SLURRIES

CROSS-REFERENCE TO RELATED APPLICATIONS

This application is a continuation-in-part of prior application Ser. No. 09/368,405, filed Aug. 4, 1999, now abandoned, which is a continuation-in-part of prior application Ser. No. 09/224,394 filed Dec. 31, 1998, now U.S. Pat. No. 6,129,818, which is a continuation-in-part of prior application Ser. No. 09/058,494, filed Apr. 10, 1998, now U.S. Pat. No. 5,954,925.

TECHNICAL FIELD

This invention relates generally to gas-liquid and gas-slurry reactions, and more particularly to a method of and apparatus for creating sub-micron bubbles in liquids and slurries.

BACKGROUND AND SUMMARY OF THE INVENTION

Gas-liquid and gas-slurry reactions present unique problems not found in single phase reactions. The rate and efficiency of a gas-liquid reaction is dependent on the amount of contact between the gas and the liquid. The contact occurs at the interface of the liquid and the gas and is, therefore, dependent upon the surface area of the gas bubbles in the liquid. For a given amount of gas, the smaller the bubbles, the greater the surface area. It is therefore advantageous to produce smaller bubbles in order to achieve the best reaction efficiency.

Despite the advantages inherent in producing minute-sized bubbles—thereby increasing the reactive surface area of the gas in the gas-liquid reaction—no commercially viable system that works for fast and slow fluid flow rates has heretofore been developed.

The present invention comprises a method and apparatus which overcomes the foregoing and other difficulties that have long since characterized the prior art. In accordance with the broader aspects of the invention there is generated a stream of sub-micron sized gas bubbles. Due to their extremely small size, the gas bubbles have an extremely large surface area which increases reaction efficiency. Smaller pores in a gas permeable partition, i.e., pores having diameters of between about 0.1 microns and about 2 microns, facilitate the formation of smaller bubbles. Additionally, high velocity relative movement between a liquid and the partition surface aids in shearing the bubbles off the surface while they are still small.

In accordance with first, second, and third embodiments of the invention, a gas permeable tube is positioned within a glass tube and water or other liquid is caused to continuously flow through the annular space between the two tubes. Gas is directed into the interior of the gas permeable tube and is maintained at a pressure high enough to cause gas to pass into the water or other liquid and prevent the flow of water or other liquid into the interior of the gas permeable tube. As the water or other liquid passes over the gas permeable tube, gas bubbles are continually sheared off of its surface. The gas bubbles thus generated are sub-micron in size and therefore present an extremely large surface area. The gas permeable tube may also be rotated relative to the liquid.

In accordance with a fourth embodiment of the invention, there is provided a hollow disk which supports a gas permeable partition. The disk is positioned within a water or other liquid filled container. Gas is directed into the interior of the disk and is maintained at a pressure high enough to cause gas to pass outwardly through the partition and into the water or other liquid and to prevent the flow of water or other liquid into the interior of the disk. The disk and the partition are moved at high speed relative to the liquid. As the gas permeable partition moves relative to the water or other liquid, gas bubbles are continually sheared off of its surface. The gas bubbles thus generated are sub-micron in size and therefore present an extremely large surface area.

In accordance with all embodiments of the invention, the viscosity of the liquid into which the sub-micron sized gas bubbles will be produced is an inherent characteristic of the liquid. Liquids which are highly viscous will not allow for the ideal relative movement between the partition and the liquid, resulting in the poor bubble formation. However, as viscosity is proportional to temperature, one can increase the temperature of the liquid to decrease the viscosity of the liquid, overcoming this limitation.

BRIEF DESCRIPTION OF THE DRAWINGS

A more complete understanding of the invention may be had by reference to the following Detailed Description when taken in conjunction with the accompanying Drawings wherein.

DETAILED DESCRIPTION

Figure 1:
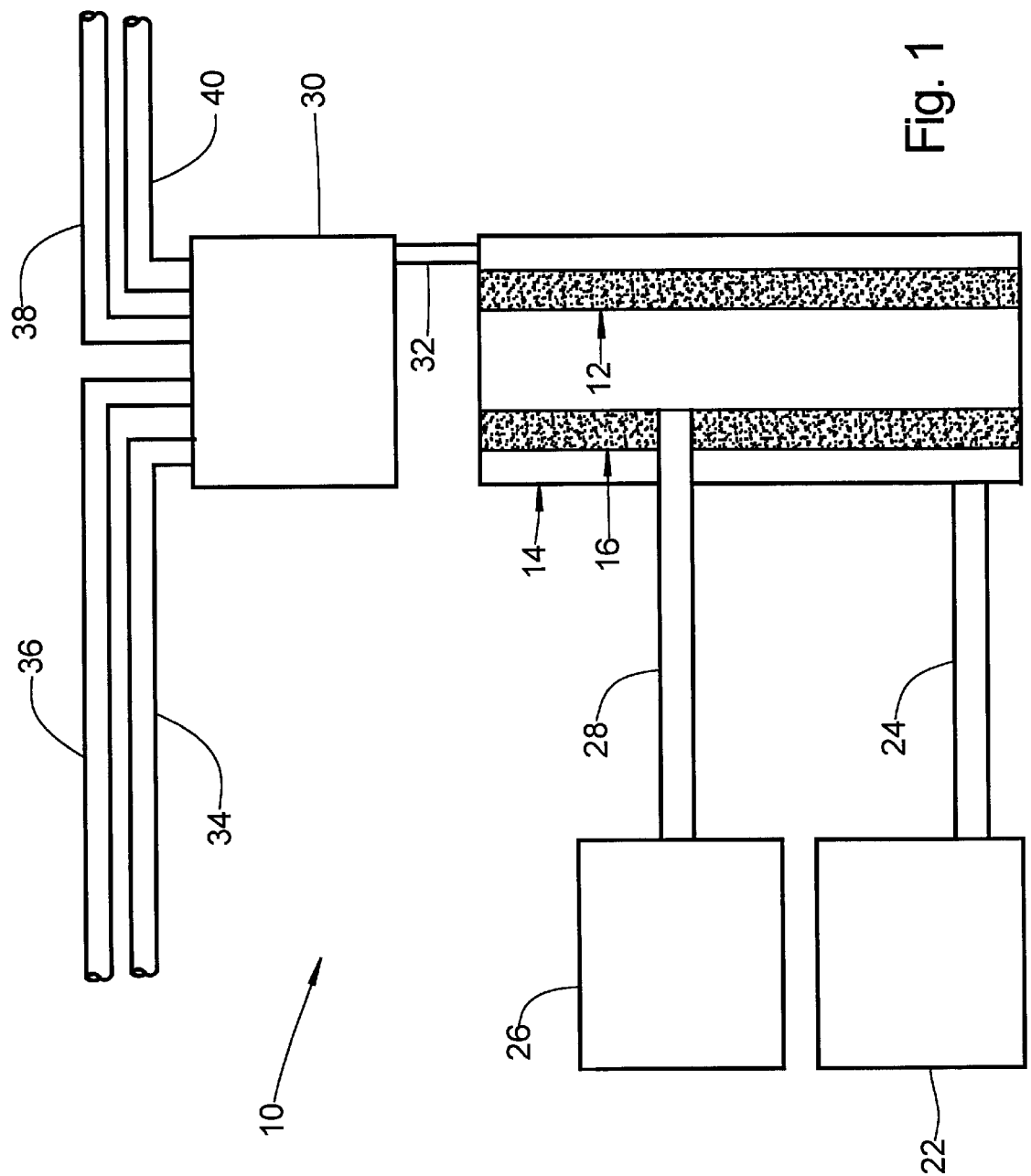
FIG. 1 is a diagrammatic illustration of a method and apparatus for producing sub-micron bubbles in liquids and slurries comprising a first embodiment of the present invention.

Referring now to the Drawings, and particularly to FIG. 1 thereof, there is shown an apparatus for forming sub-micron bubbles in liquids and slurries comprising a first embodiment of the invention. The apparatus 10 includes a gas permeable tube 12 positioned within a glass tube 14. The tube 12 can comprise sintered stainless steel, sintered glass, or sintered ceramic materials. Regardless of the material used in its construction, the gas permeable tube 12 is characterized by pores having diameters of between about 0.1 microns and about 2.0 microns. In the case of round or nearly round pores, the term "diameter" is used herein in its usual sense. In the case of non-round pores, the term "diameter" is used herein to define the major dimension thereof.

As illustrated in FIG. 1, both the gas permeable tube 12 and the glass tube 14 comprise right circular cylinders with the tube 12 extending concentrically relative to the tube 14. Other geometrical configurations of and positional relationships between the gas permeable tube 12 and the glass tube 14 may be utilized in accordance with the requirements of particular applications of the invention.

In the operation of the apparatus 10, a quantity of water or other liquid is received in a reservoir 22. Water or other liquid from the reservoir 22 is directed into the annular space between the gas permeable tube 12 and the glass tube 14 through piping 24. During the operation of the apparatus 10 water or other liquid flows through the annulus between the gas permeable tube 12 and the glass tube 14 on a continuous basis.

A quantity of gas is stored in a reservoir 26. In the operation of the apparatus 10, gas is directed from the reservoir 26 into the interior of the gas permeable tube 12 through piping 28. The gas within the gas permeable tube 12 is maintained at a pressure high enough to cause the gas to pass through the walls of the tube 12 into the water or other liquid and prevent the flow of water or other liquid into the interior of the tube 12.

In the operation of the apparatus 10, the water or other liquid flowing through the annular space between the gas permeable tube 12 and the glass tube 14 causes gas bubbles to be continuously stripped off the exterior surface of the tube 12. In this manner the size of the gas bubbles is maintained in the sub-micron range. The sub-micron size of the gas bubbles provides an enormous surface area which in turn results in unprecedented reaction efficiency.

The water or other liquid flowing from the annulus between the gas permeable tube 12 and the glass tube 14 having reaction products contained therein may be directed to a distillation apparatus 30 through piping 32. The distillation apparatus 30 separates the outflow from the space between the tube 12 and the tube 14 into one or more streams 34, 36, 38, and 40.

The present invention further comprises a method of producing sub-micron bubbles in liquids and slurries. In accordance with the method, a gas permeable tube is positioned within a glass tube. Water or other liquid is directed through the annulus between the gas permeable tube and the glass tube, and gas is directed into the interior of the gas permeable tube. The water or other liquid flowing between the gas permeable tube and the glass tube continuously strips sub-micron size bubbles from the exterior surface of the gas permeable tube.

The use of an internal gas permeable partition cylinder is shown in FIG. 1. One skilled in the art would also recognize that a vast number of shapes and orientations could be used to accomplish the same purpose. For example, the glass tube 14 does not need to be shaped as a tube in order to be functional as a housing. Additionally, the orientation of the gas inside an inner tube with water or other liquid between the inner tube and a housing is not required. One skilled in the art could envision a housing bisected by a gas permeable partition creating a water or other liquid chamber and a gas chamber. The only requirement of such an embodiment is that the chamber has a source of water or other liquid and a product outlet, which leads to an isolation apparatus, preferably a distillation apparatus; the gas chamber has a gas source; and the gas permeable partition allows the penetration of gas bubbles that are sheared off by the relative movement between water or other liquid in the chamber and the gas permeable membrane.

Figure 2:
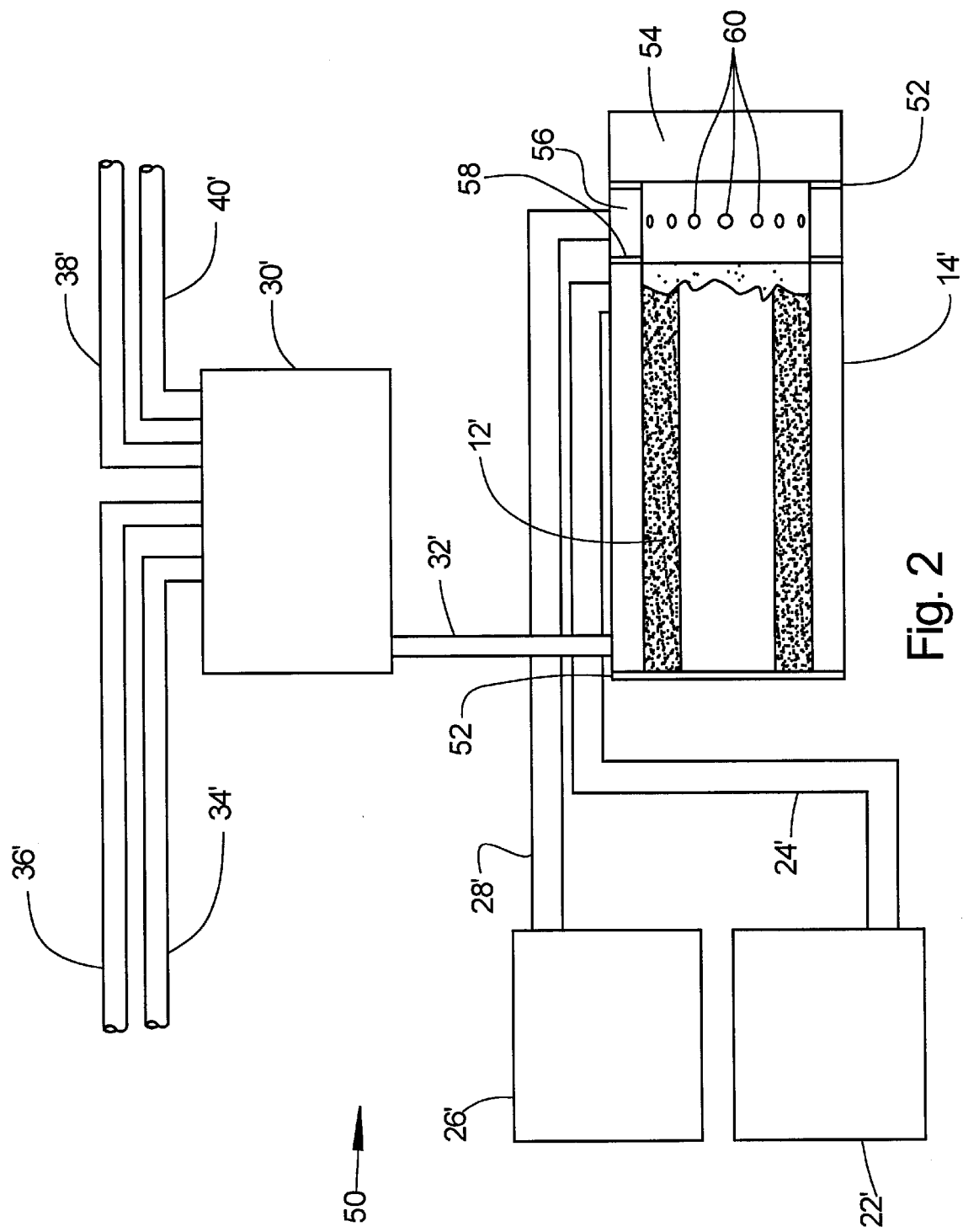
FIG. 2 is a diagrammatic illustration of a second embodiment of the apparatus of the present invention with a rotating gas permeable tube.

Referring now to FIG. 2, there is shown an apparatus for producing sub-micron bubbles in liquids and slurries comprising a second embodiment of the invention. The apparatus 50 comprises numerous component parts which are substantially identical in construction and function to the apparatus 10 for producing sub-micron bubbles in liquids and slurries shown in FIG. 1 and described hereinabove in conjunction therewith. Such identical component parts are designated in FIG. 2 with the same reference numerals utilized in the description of the apparatus 10, but are differentiated therefrom by means of a prime (') designation.

In the apparatus 50, the gas permeable tube 12' is supported for rotation relative to the glass tube 14' by sealed bearings 52. Those skilled in the art will appreciate the fact that bearing/seal assemblies comprising separate components may be utilized in the practice of the invention, if desired.

A motor 54 is mounted at one end of the glass tube 14' and is operatively connected to the gas permeable tube 12' to effect rotation thereof relative to the glass tube 14'. The glass tube 14' includes an end portion 56 which is isolated from the remainder thereof by a seal 58. The portion of the tube 12' extending into the end portion 56 of the glass tube 14' is provided with a plurality of uniform or nonuniform apertures 60.

In the operation of the apparatus 50, gas is directed from the reservoir 26' through the piping 28' through the end portion 56 of the glass tube 14' and through the apertures 60 into the interior of the gas permeable tube 12'. Water or other liquid flows from the reservoir 22' through the piping 24' into the portion of the glass tube 14' that is isolated from the end portion 56 by the seal 58. Water or other liquid flows out of the glass tube 14' through piping 32' to the distillation apparatus 30'.

The operation of the apparatus for producing sub-micron bubbles 50 of FIG. 2 differs from the operation of the apparatus 10 of FIG. 1 in that in the operation of the apparatus 50, the relative movement between the bubbles forming on the surface of the gas permeable tube 12' and the water or other liquid contained within the glass tube 14' is controlled by the motor 54 rather than the flow rate of the water or other liquid as it passes through the glass tube 14'. This is advantageous in that it allows the gas permeable tube 12' to be rotated at a relatively high velocity relative to the water or other liquid contained within the glass tube 14', thereby assuring that sub-micron size bubbles will be sheared from the surface of the gas permeable tube 12'. Meanwhile, the velocity of the water or other liquid passing through the interior of the glass tube 14' can be relatively slow, thereby assuring a maximum number of sub-micron size bubbles entering the water or other liquid per unit volume thereof.

Figure 3:
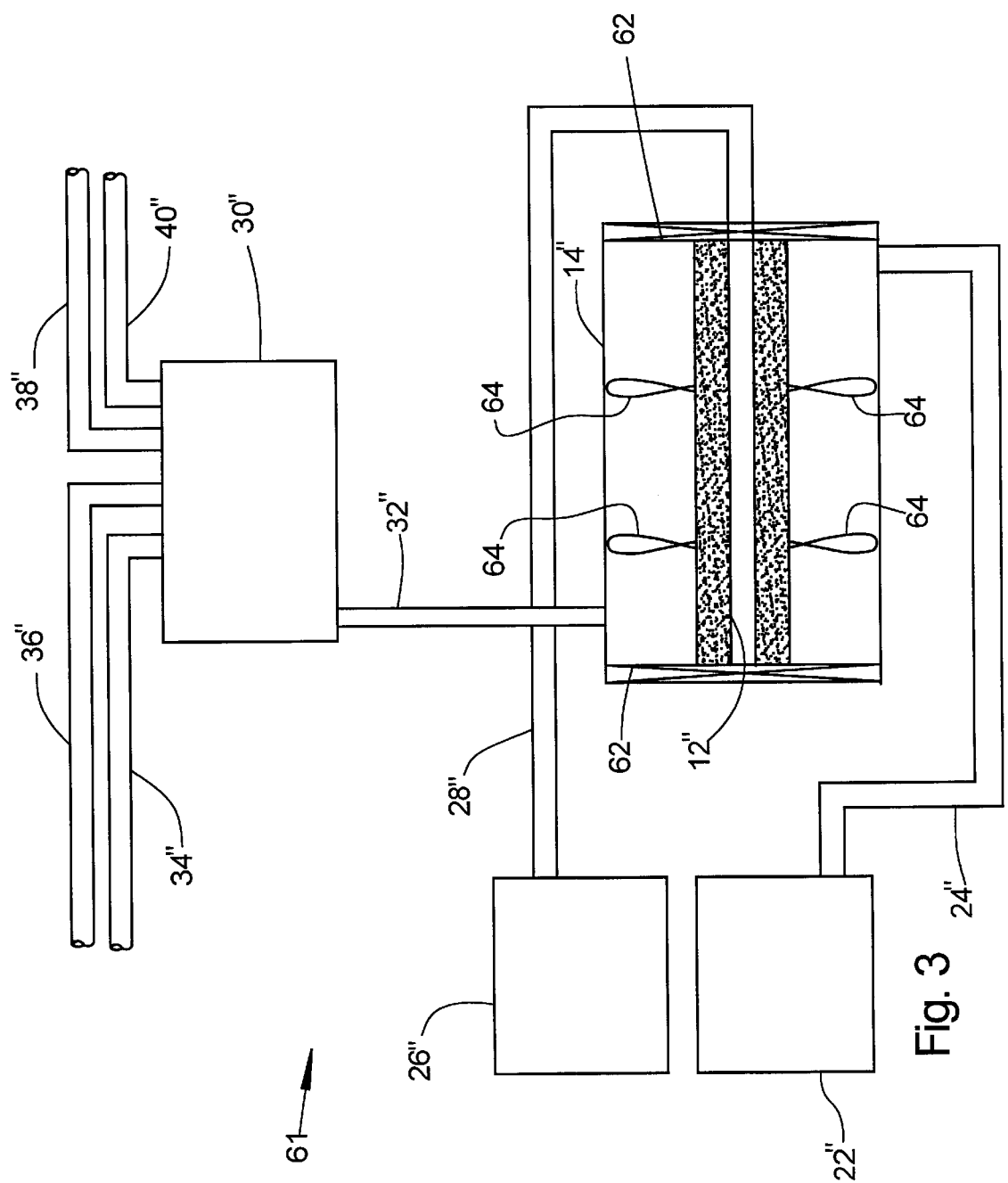
FIG. 3 is a diagrammatic illustration of a third embodiment of the apparatus of the present invention with a rotating gas permeable tube with turbines.

An apparatus for producing sub-micron bubbles comprising a third embodiment of the invention is illustrated in FIG. 3. The apparatus 60 comprises numerous component parts which are substantially identical in construction and function to component parts of the apparatus 10 illustrated in FIG. 1 and described hereinabove in conjunction therewith. Such identical component parts are designated in FIG. 3 with the same reference numerals utilized in the description of the apparatus 10, but are differentiated therefrom by means of a double prime (") designation.

The apparatus 60 comprises a gas permeable tube 12" which is supported for rotation relative to the glass tube 14" by sealed bearings 62. Those skilled in the art will appreciate the fact that the apparatus 60 may be provided with bearing/seal assemblies comprising separate components, if desired.

The gas permeable tube 12" is provided with one or more turbines 64. The pitch of the turbines 64 is adjusted to cause the tube 12" to rotate at a predetermined speed in response to a predetermined flow rate of water or other liquid through the glass tube 14".

Similar to the apparatus of FIG. 2, the use of the apparatus 61 is advantageous in that the gas permeable tube 12" can be caused to rotate relatively rapidly in response to a relatively low flow rate of water or other liquid through the glass tube 14". This assures that sub-micron size bubbles will be stripped from the outer surface of the gas permeable tube 12" and that a maximum number of bubbles will be received in the water or other liquid flowing through the glass tube 14" per unit volume thereof. The use of the apparatus 61 is particularly advantageous in applications of the invention wherein water or other liquid flows through the system under the action of gravity, in that the use of the turbines 64 eliminates the need for a separate power source to effect rotation of the gas permeable tube 12" relative to the glass tube 14".

Figure 4:
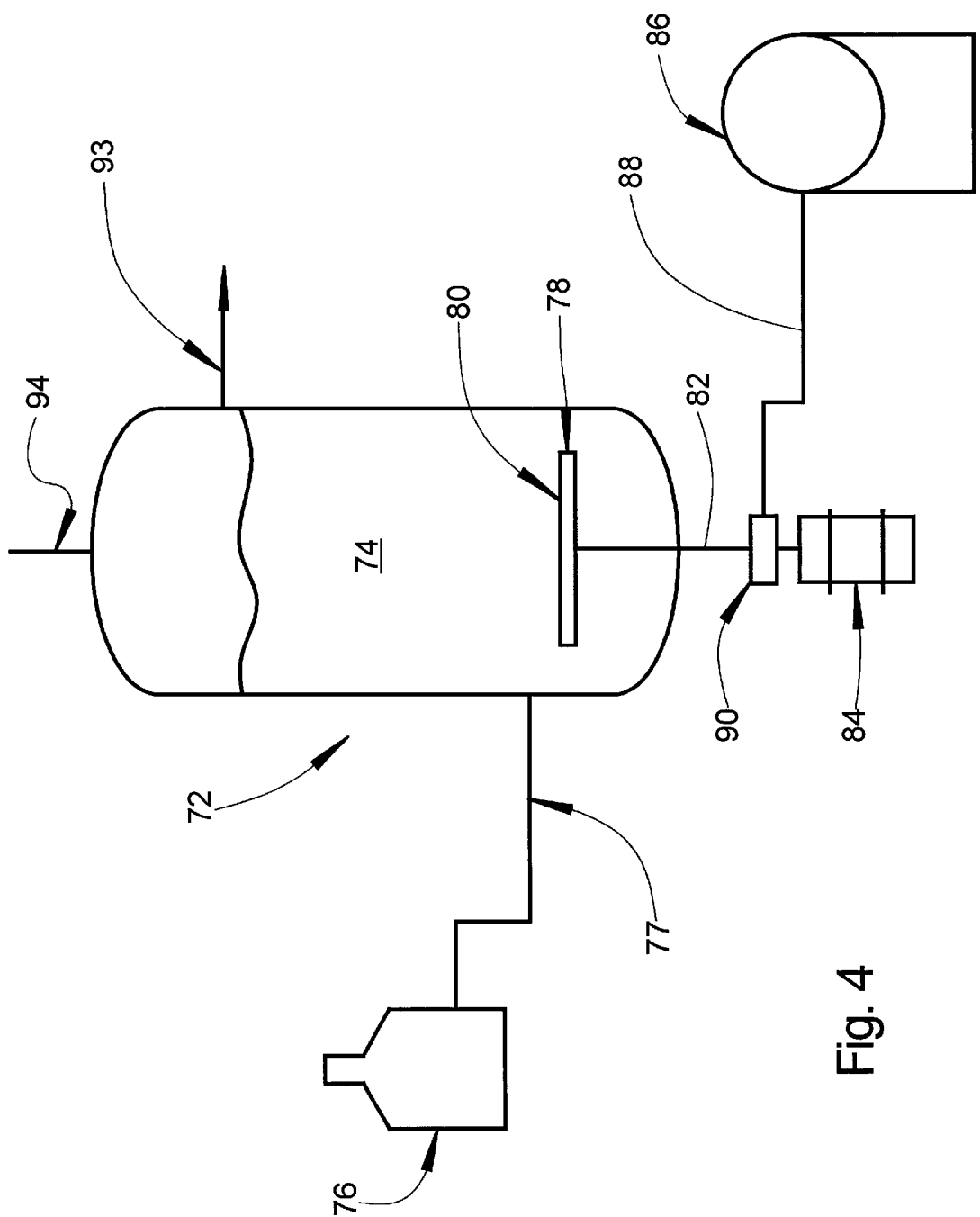
FIG. 4 is a diagrammatic illustration of a fourth embodiment of the apparatus of the present invention.
Figure 5:
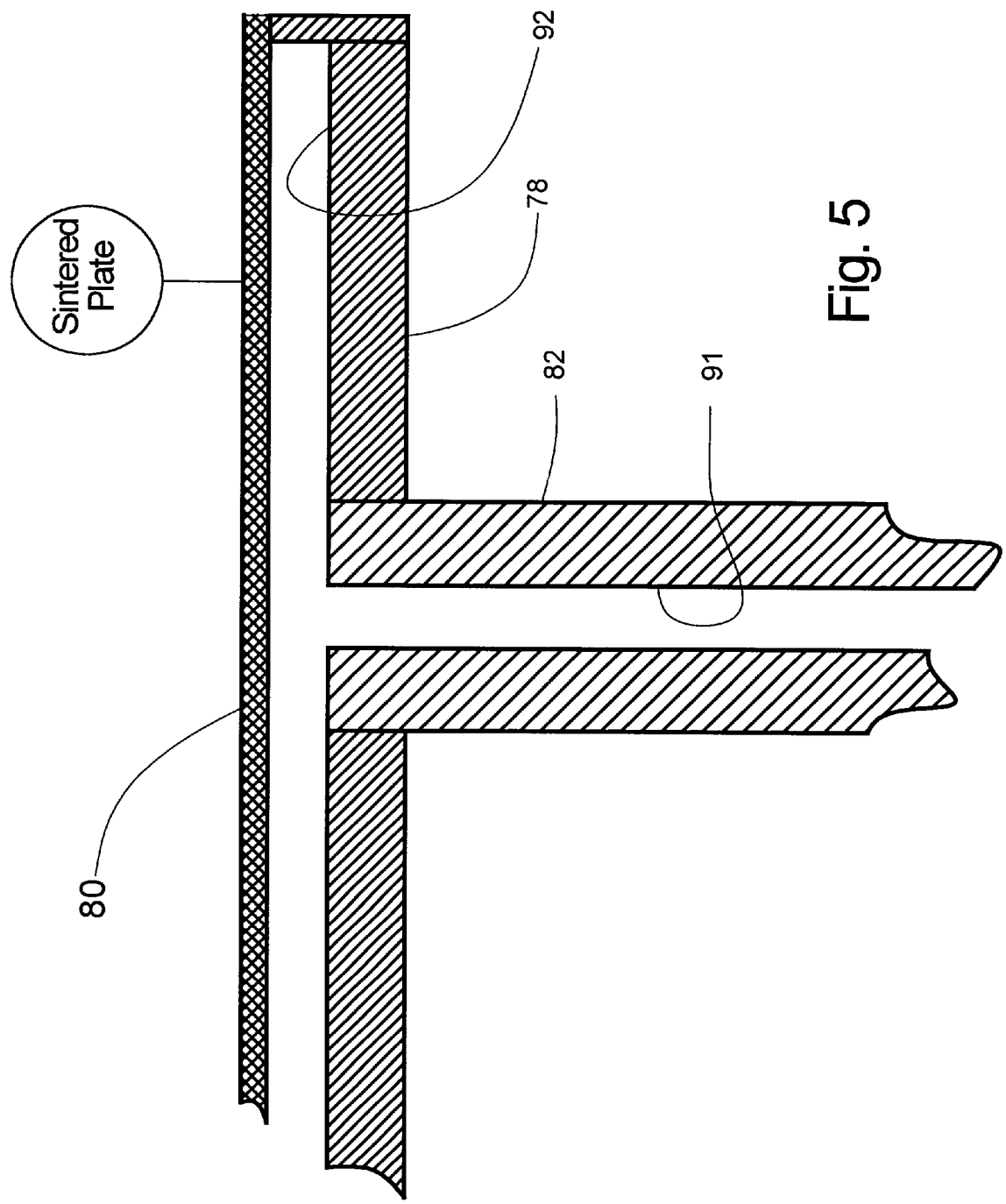
FIG. 5 is an enlargement of a portion of FIG. 4.

Referring now to FIGS. 4 and 5, there is shown a method of and apparatus for producing sub-micron bubbles in liquids and slurries 70 comprising a fourth embodiment of the invention. In accordance with a fourth embodiment of the invention, there is provided a tank 72 having a quantity of water or other liquid 74 contained therein. Water or other liquid is supplied to the tank 72 from a source 76 through piping 77.

A hollow disk 78 is mounted in the lower portion of the tank 72. As is best shown in FIG. 5, the disk 78 includes a gas permeable partition 80 supported on a tube 82 for rotation within the tank 72 under the operation under the motor 84. The partition 80 may comprise sintered stainless steel, sintered glass, or sintered ceramic materials depending upon the requirements of particular applications of the invention. Regardless of the material used in its construction, the gas permeable partition 80 is characterized by pores having diameters of between about 0.1 microns and about 2.0 microns. In the case of round or nearly round pores, the term "diameter" is used herein in its usual sense. In the case of non-round pores, the term "diameter" is used herein to define the major dimension thereof.

Gas received from a supply 86 is directed through piping 88 and a suitable commutator 90 into the tube 82 and through the tube 82 into the interior of the hollow disk 78. The tube 82 has a hollow interior 91 and the disk 78 has a hollow interior 92 connected in fluid communication therewith.

The disk 78 is supplied with gas at a pressure just high enough to overcome the head pressure of the water or other liquid 74. The disk 78 is rotated, oscillated, and/or reciprocated by the motor 84 at an appropriate speed relative to the water or other liquid 74 such that a shearing phenomenon occurs at the surface of the gas permeable partition 80 thus producing bubbles of extremely small, i.e., sub-micron, size. The extreme small size of the bubbles thus produced results in a surface area to volume ratio of small bubbles which significantly improves the efficiency of the reaction. Liquid is recovered from the tank 72 through outlet 93 and gas is recovered from the tank 72 through outlet 94.

Although preferred embodiments of the invention have been illustrated in the accompanying Drawings and described in the foregoing Detailed Description, it will be understood that the invention is not limited to the embodiments disclosed but is capable of numerous rearrangements, modifications, and substitutions of parts and elements without departing from the spirit of the invention.

I claim:

1. An apparatus for producing sub-micron bubbles in liquids and slurries comprising:

a quantity of liquid;

a disk-shaped hollow chamber positioned in the liquid and including a gas permeable partition engaging the liquid;

the gas permeable partition comprising a liquid engaging surface;

the gas permeable partition comprising pores having diameters between about 0.1 microns and about 2.0 microns;

apparatus for maintaining gas within the interior of the hollow chamber at a predetermined pressure sufficient to cause gas flow through the gas permeable partition while preventing liquid flow therethrough; and apparatus for causing relative movement between the gas permeable partition and the liquid in a direction extending across the liquid engaging surface.

2. The apparatus according to claim 1 wherein the gas permeable partition comprises a sintered stainless steel partition.

3. The apparatus according to claim 1 wherein the gas permeable partition comprises a sintered glass partition.

4. The apparatus according to claim 1 wherein the gas permeable partition comprises a sintered ceramic partition.

5. The apparatus according to claim 1 wherein the apparatus for causing relative movement between the gas permeable partition and the liquid comprises apparatus for rotating the gas permeable partition relative to the liquid.

6. The apparatus according to claim 1 wherein the apparatus for causing relative movement between the gas permeable partition and the liquid comprises apparatus for oscillating the gas permeable partition relative to the liquid.

7. The apparatus according to claim 1 wherein the apparatus causing relative movement between the gas permeable partition and the liquid comprises apparatus for reciprocating the gas permeable partition relative to the liquid.

* * * * *